April 5, 1949.　　　　　J. N. RYLEN　　　　　2,466,279
RESILIENT BODY SUPPORT
Filed March 28, 1946
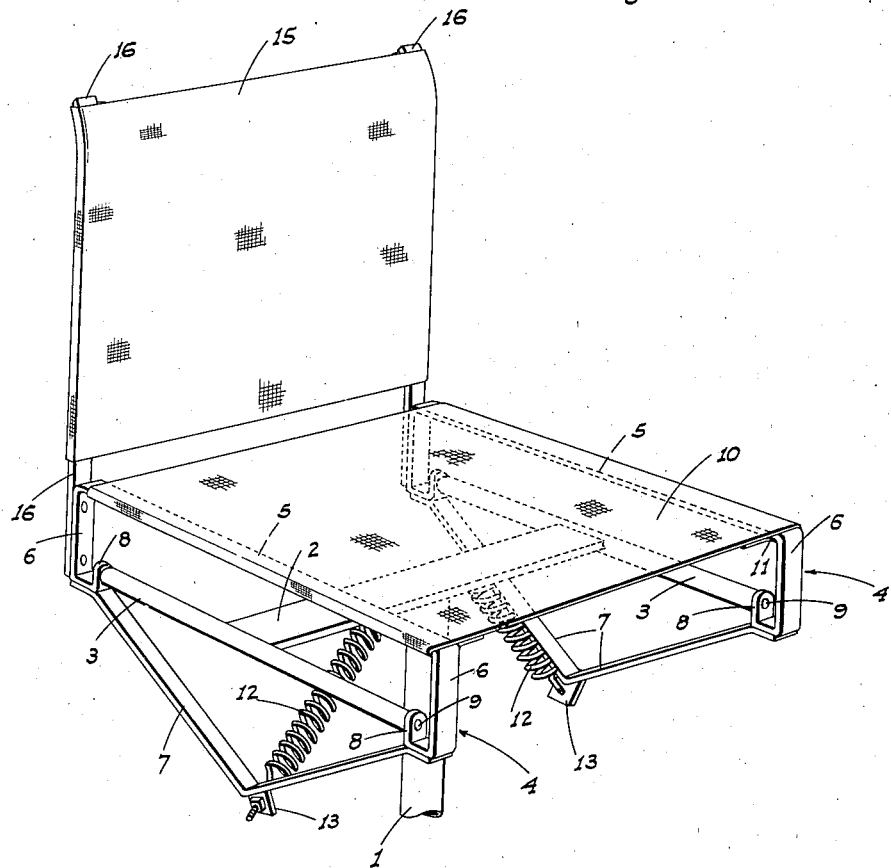
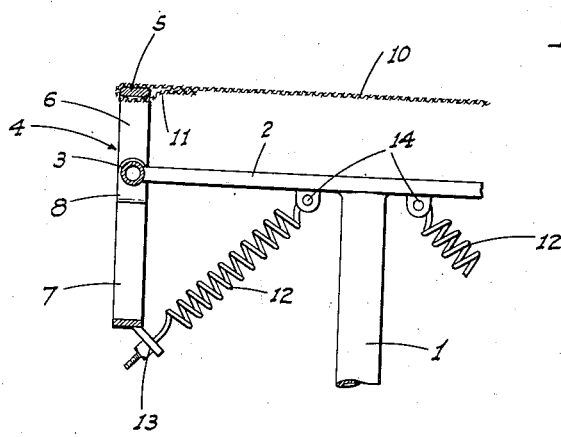
INVENTOR
Jos. N. Rylen
BY
ATTORNEYS Patented Apr. 5, 1949

2,466,279

UNITED STATES PATENT OFFICE 2,466,279

RESILIENT BODY SUPPORT

Joseph N. Rylen, Turlock, Calif.

Application March 28, 1946, Serial No. 657,680

3 Claims. (Cl. 155—9)

This invention relates in general to improvements in body supports such as seats, beds, or the like; the invention being here shown and described as embodied in a seat, but shall not be limited to use therein.

One object of the present invention is to provide a seat which is shock absorbing and form fitting, thus providing a body support of soft and comfortable character.

Another object of the invention is to provide a shock absorbing seat which is especially designed for use on motor vehicles, tractors, agricultural implements, etc.

A further object of the invention is to provide a seat which comprises a rigid support having transversely spaced, laterally swingable frames pivoted thereon, a flexible seat connected to and extending between such swing frames, and spring means urging the swing frames in a direction to yieldably tension said seat.

A further object of the invention is to provide a practical body support, and one which will be effective for the purposes for which it is designed.

These objects are accomplished by means of such structure and relative arrangement of parts as will fully appear by a perusal of the following specification and claims.

In the drawings:

Fig. 1 is a perspective view of the seat.

Fig. 2 is a fragmentary transverse section of the seat.

Referring now more particularly to the characters of reference on the drawings, the improved seat comprises a rigid standard 1 having a horizontal cross member 2 fixed on the upper end thereof and projecting equal distances laterally therefrom. The standard 1 and horizontal cross member 2 form a supporting frame for the remainder of the seat structure.

At the outer ends the horizontal cross member 2 is fitted with parallel end bars 3 which extend in a front to rear direction.

The seat includes a pair of transversely spaced, upstanding swing frames 4 which extend in the same direction as the end bars 3 and are pivotally connected to the latter for lateral swinging movement as follows:

Each swing frame 4 includes, in unitary relation, a top bar 5, ends 6, and downwardly converging legs 7 which merge at their lower ends. Directly inwardly of the lower end portions of the ends 6 each swing frame 4 includes a pair of facing upstanding ears 8 which are pivotally connected, as at 9, to the adjacent end of the corresponding bar 3. As so formed and mounted the swing frames 4 are capable of lateral swinging movement, as will be evident.

A flexible seat 10 of fabric, such as canvas, extends between the top bars 5; said seat being formed at the ends with loops 11 through which said top bars pass.

The flexible seat 10 is normally maintained relatively taut or under tension, but yieldably so, by loaded tension springs 12 which connect between the lower end of each swing frame 4, as at 13, and the horizontal cross member 2 adjacent the standard 1, as at 14.

It will be seen that when a person sits on the seat 10, the latter yields to a certain extent, as permitted by the springs 12; the swing frames 4 moving in or out laterally as the seat arrangement absorbs shocks. By virtue of the described arrangement thereof, the seat not only absorbs shocks but is very comfortable in use.

If desired a flexible back 15 may be affixed to the seat by attaching said back between back posts 16 which upstand from the swing frames 4 at the rear ends of the latter.

When the seat is used on a motor vehicle, tractor, or farm implement it may be readily affixed thereto by attaching the standard 1 in any convenient manner. Further, as the seat is a unitary arrangement, supported by the single standard 1, it can be easily moved from one place of use to another.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A body support comprising a standard, a horizontal cross member attached intermediate its ends to the standard at the top, upstanding, transversely spaced swing frames disposed adjacent corresponding ends of the cross member, means pivotally mounting the swing frames in connection with said cross member for lateral swinging motion, a sheet of flexible material connected to and extending between the swing frames above the standard and cross member, and spring means yieldably urging the swing frames in a direction to tension said sheet.

2. A body support comprising a standard, a horizontal cross member attached intermediate its ends to the standard at the top, upstanding, transversely spaced swing frames disposed adjacent corresponding ends of the cross member, each swing frame including a top bar and a depending leg structure, means pivoting the swing frames between the top bar and leg structure for lateral swinging movement, a sheet of flexible material connected to and extending between the top bars of the swing frames, and tension springs connected to the leg structure in a manner to urge the swing frames in a direction to yieldably tension said sheet; said swing frame pivoting means comprising, for each frame, a front to rear bar fixed on the adjacent end of the cross member, and pivotal connections between the ends of said front to rear bar and corresponding points on the frame.

3. A body support comprising a standard, a horizontal cross member attached intermediate its ends to the standard at the top, upstanding, transversely spaced swing frames disposed adjacent corresponding ends of the cross member, each swing frame including a front to back top bar, depending ends, and legs converging downward from the ends, said legs being secured together at their lower ends; horizontal end bars rigidly attached intermediate their ends to corresponding ends of the cross member and extending in a front to rear direction, the swing frames being pivoted between the top bars and legs to said end bars at spaced points for lateral swinging motion, a sheet of flexible material connected to and extending between the top bars, and tension springs connected between the legs of the swing frames, and the assembly of standard and cross member in a manner to urge the frames in a direction to yieldably tension the sheet.

JOSEPH N. RYLEN.

REFERENCES CITED

The following references are of record in the file of this patent:

UNITED STATES PATENTS

| Number | Name | Date |
|---|---|---|
| 859,470 | Van Orman | July 9, 1907 |
| 1,253,858 | Masters | Jan. 15, 1918 |
| 1,813,020 | Brown | July 7, 1931 |
| 1,905,830 | Ericson | Apr. 25, 1933 |
| 2,272,652 | Wiener | Feb. 10, 1942 |